United States Patent
Brane

[11] 3,779,281
[45] Dec. 18, 1973

[54] WATER SOFTENER VALVE ASSEMBLY WITH REGENERATION CAPABILITY

[75] Inventor: Earl P. Brane, Largo, Fla.

[73] Assignee: Laurtech International Company, Racine, Wis.

[22] Filed: Sept. 18, 1972

[21] Appl. No.: 290,233

[52] U.S. Cl............................ 137/625.29, 210/191
[51] Int. Cl............................................. B01d 29/38
[58] Field of Search................... 137/599.1, 625.29; 210/139, 140, 141, 190, 191

[56] References Cited
UNITED STATES PATENTS

| | | | |
|---|---|---|---|
| 2,553,458 | 5/1951 | Jordan | 137/625.29 |
| 3,237,640 | 3/1966 | Whitlock et al. | 137/625.29 UX |
| 3,307,581 | 3/1967 | Rudelick | 137/625.29 |

*Primary Examiner*—Robert G. Nilson
*Attorney*—John V. Moriarty

[57] ABSTRACT

A valve assembly for a water softener which is capable of regenerating the water softening material within the tank. The assembly has a housing including a plurality of passages and chambers through which a tube is slidably movable. A plurality of seals are mounted to the tube and are sealingly engageable with various passages to direct the fluid in the desired directions. One position of the movable tube forces the incoming water to flow through the water softener tank and then out through the soft water outlet. A second position of the movable tube causes the hard water flowing in the inlet of the assembly to flow immediately out of the assembly through the soft water outlet. In addition, the hard water is caused to flow in a reverse direction through the water softening tank thereby providing a backwash with the drain water exiting the assembly through a drain exit. A third position of the movable tube causes brine to flow into the water softener tank and a subsequent flow rinse of the water softening tank. The last position of the movable tube causes a fast rinse of the water softening tank while simultaneously refilling the brine storage tank. A plurality of pistons are utilized to control the movement of the movable tube.

7 Claims, 7 Drawing Figures

WATER SOFTENER VALVE ASSEMBLY WITH REGENERATION CAPABILITY

BACKGROUND OF THE INVENTION

1. Field of the Invention

This invention is in the field of water softening devices.

2. Description of the Prior Art

Many types of water softening valves have heretofore been proposed for use in directing the flow of water during the softening of the water and/or the regeneration cycle of the water softening tank. A water softening valve structure is disclosed in my U.S. Pat. No. 3,348,574. Periodically, the water softening material within the water softening tank must be regenerated with brine in the tank then being flushed out and brine replensihed in the brine storage tank. It is desirable to accomplish the regeneration completely automatically with the apparatus accomplishing the same providing for a relatively low pressure drop between the inlet and outlet of the water softening apparatus. Disclosed herein is a new and improved water softening apparatus which allows for the automatic regeneration of the water softening tank while at the same time providing a constant flow of water to the user. Thus, water flow to the user does not have to be interrupted even though regeneration is occurring. The structure is designed to minimize the pressure drop between the inlet and outlet.

SUMMARY OF THE INVENTION

One embodiment of the present invention is a water softener valve assembly comprising: a housing having a hard water inlet, a soft water outlet, an inlet port and an outlet port connectable to a water softener tank, a brine inlet, a drain outlet, and first, second, third and fourth chambers, the housing having a first passage between the first and second chambers, a second passage between the third and fourth chambers, and a third passage between the first and fourth chambers, the hard water inlet opens into the first chamber, the second chamber opens into the inlet port, the outlet port opens into the third chamber, the fourth chamber extends from the second passage to the soft water outlet and to the third passage; a drain tube connected to the drain outlet and being fixedly mounted in the housing; a piston fixedly mounted in the housing and projecting through the first passage and third passage; and, a movable tube slidingly mounted in the housing and extending through the passages, the movable tube having opposite ends sealingly receiving respectively the piston and the drain tube and having an aperture between the opposite ends allowing fluid flow into the movable tube and then into the drain tube and out the drain outlet, the movable tube having first and second seals fixedly mounted thereon being slidingly engageable with the housing to support the movable tube and limit fluid flow through the passages, the movable tube having a first position corresponding to a water softening step with the first seal sealingly engaging the third passage and preventing fluid flow directly from the first chamber to the fourth chamber and allowing fluid flow from the hard water inlet to flow from the first chamber through the first passage and into the second passage and then through the inlet port and into the water softener tank and back out the outlet port to the soft water outlet, the piston sealingly projecting between the aperture and the drain tube preventing water flow out the drain tube.

It is an object of the present invention to provide a new and improved valve for attachment to a water softening tank with the valve directing the flow of water during the water softening and regeneration cycle.

It is another object of the present invention to provide a water softening apparatus which is completely automatic.

Related objects and advantages of the present invention will be apparent from the following description.

DESCRIPTION OF THE PREFERRED EMBODIMENT

Figure 1:
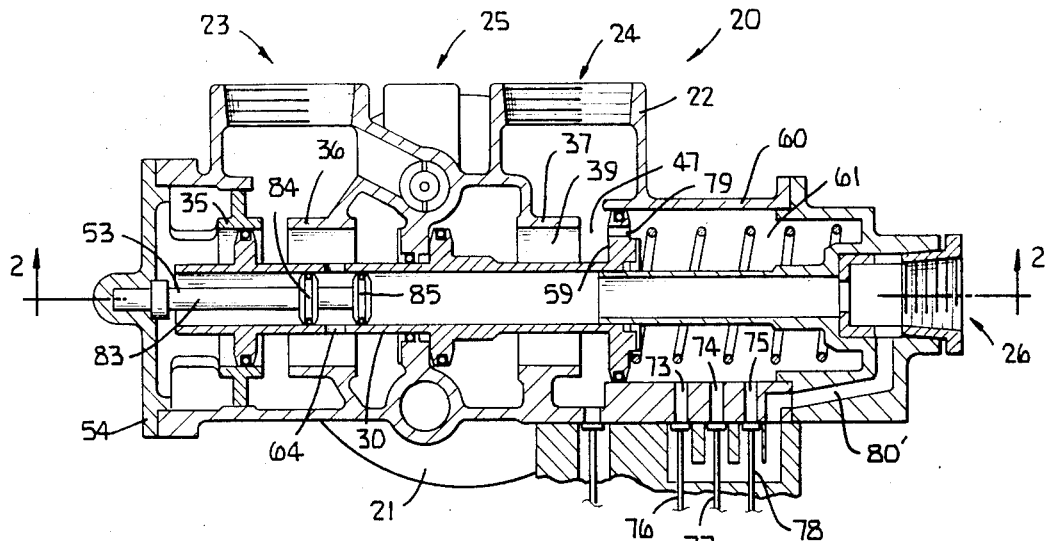
FIG. 1 is a fragmentary cross-sectional top view taken along the line 1—1 of FIG. 2 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
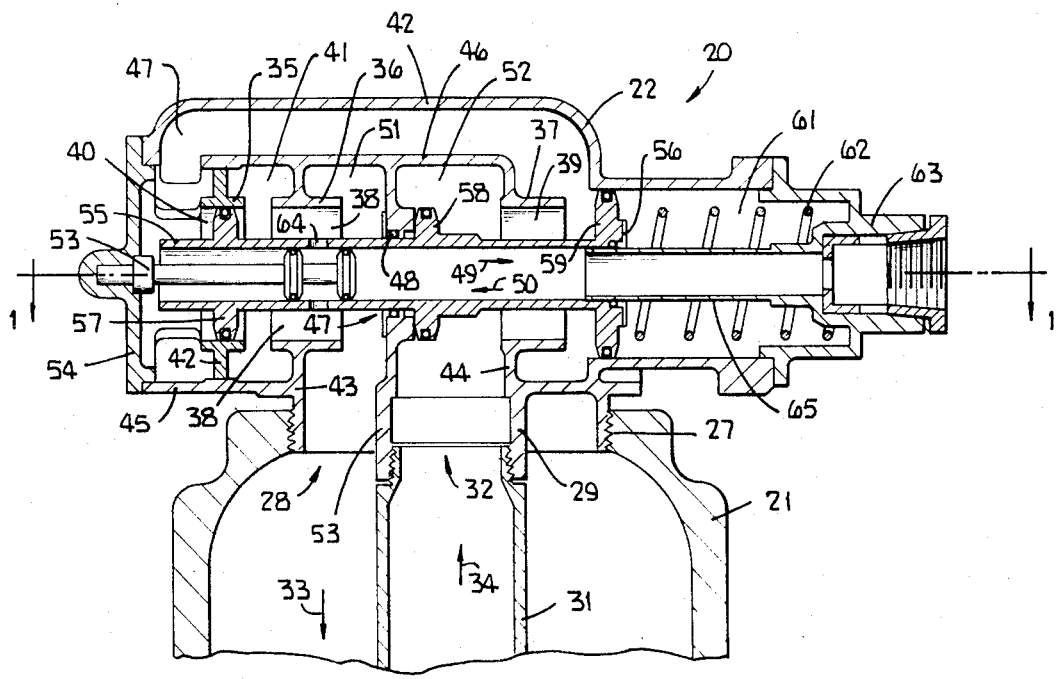
FIG. 2 is a fragmentary cross-sectional side view taken along the line 2—2 of FIG. 1 and viewed in the direction of the arrows.
Figure 3:
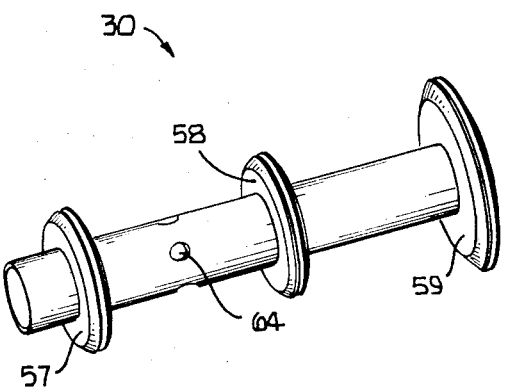
FIG. 3 is an enlarged perspective view of movable tube 30 shown in FIGS. 1 and 2.

Referring now more particularly to FIGS. 1 and 2, there is shown a water softener valve assembly 20 which is mounted to a water softener tank 21. The housing 22 of assembly 20 has a hard water inlet 23 and a soft water outlet 24. The hard water which enters inlet 23 is processed by the apparatus thereby exiting outlet 24 in a soft water condition. Another inlet 25 is connected to a brine storage tank for use in regeneration. A second outlet 26 of housing 22 allows for escape of drain water from the tank and assembly. The bottom portion on housing 22 is formed into a flange 27 having threads which meshingly engage the threads of tank 21. Centrally positioned in mounting flange 27 is a tube 29 which is integrally connected to housing 22. Tube 29 extends centrally through flange 27 having internal threads which are in meshing engagement with the external threads of an upstanding tube 31 of tank 21. The water enters tank 21 in the direction of arrow 33 passing through the inlet port 28 and is then softened in the tank. The softened water then exits tank 21 via tube 31 and outlet port 32 of tube 29 in the direction of arrow 34.

Housing 22 is elongated and is hollow with a plurality of passages and chambers formed within the housing. Three rings 35, 36 and 37 are integrally attached to housing 22 and are coaxially aligned. Rings 35 through 37 form respectively a first passage 40, a second passage 38, and a third passage 39. Inlet port 23 opens into a first chamber 41 which is positioned between passages 40 and 38.

Rings 35 through 37 are respectively attached to housing 22 by walls 42 through 44. Walls 42 through 44 are attached to the outer wall 45 of housing 22 at all locations with the exception of the top portion of the housing whereat walls 42 through 44 are attached to the wall 46 which is spaced apart from wall 42 forming chamber 47. Tube 29 extends upwardly and is attached to wall 46 having a hole 47 through which movable tube 30 extends. An O-ring seal 48 is mounted around hole 47 and is in sealing engagement with tube 30 which is movable in the direction of arrows 49 and 50. A second chamber 51 is formed between passage 38 and tube 29 with chamber 51 emptying into inlet port 28. Another chamber 52 is formed between wall 53 of tube 29 and ring 37. Chamber 47 extends from passage 40 upwardly across the top of housing 22 and into passage 39. It will be noted that passage 39 is positioned between chambers 52 and 47 whereas passage 40 is positioned between chambers 41 and 47. The outlet port 32 opens into third chamber 52 whereas chamber 47 opens into the soft water outlet 24 and passage 39.

A piston 53 is fixedly mounted to end plate 54 of housing 22. The piston projects into movable tube 30 and projects through passages 40 and 38. Tube 30 is movable to cause the various steps of the cycle which include the softening step, the backwash step, the brine and slow rinse step, and the fast rinse and brine refill step.

The movable tube has a pair of opposite ends 55 and 56 with three seals 57, 58 and 59 fixedly mounted thereto. Each seal 57 through 59 is configured as a disc having an O-ring seals at their periphery for sealingly engaging rings 35, 36, 37 and the reduced diametered portion 60 of housing 22 which forms chamber 61. A helical spring 62 is positioned within chamber 61 having a first end in abutting engagement with end 63 of housing 22 and an opposite end in abutting engagement with seal 59. Spring 62 normally urges the movable tube to a first position as shown in FIG. 2 but is yieldable to allow the movable tube to assume the position shown in FIGS. 4, 5 and 7. It will be noted that movable tube 30 is provided with a plurality of apertures 64 between seals 57 and 58.

A drain tube 65 is fixedly mounted to end 63 of housing 22 and projects sealingly and slidably into end 56 of movable tube 30. Helical spring 62 extends wrappingly around drain tube 65 which is connected to the drain outlet 26. The movable tube is slidably mounted to the housing and extends through passages 40, 38, and 39. The tube is supported by piston 53 and drain tube 65 which extend sealingly to the opposite ends of the tube. Also, the movable tube is supported by the three seals 57 through 59 which engage the various rings and walls of the housing.

For softening the hard water which enters inlet 23, the movable tube 30 is located in the position as shown in FIGS. 1 and 2 with the first seal 57 in sealing engagement with ring 35 thereby preventing water flow from chamber 41 directly through passage 40 to chamber 47. Thus, the incoming water from inlet 23 flows into chamber 41 and then through passage 38 to chamber 51 and down into tank 21 via inlet port 28. The water is then softened and flows upwardly through tube 41 exciting the tank via outlet port 32 and emptying into chamber 52. The softened water passes from chamber 52 via passage 39 and exits the assembly via outlet 24. Piston 53 is in sealing engagement with the inner surface of movable tube 30 and prevents the water from flowing through aperture 64 and then through the movable tube to the drain tube.

Figure 4:
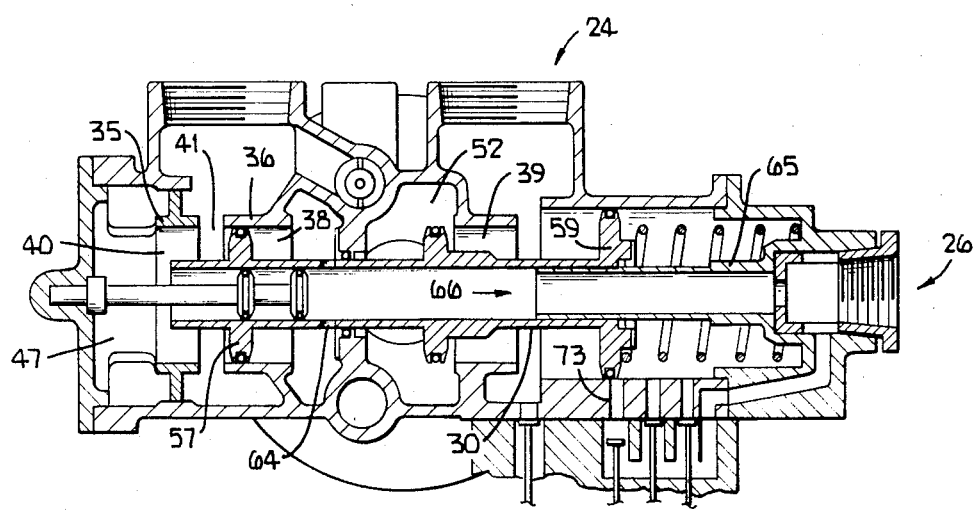
FIG. 4 is the same view as FIG. 1 only showing the movable tube in the position corresponding to the backwash cycle.

The movable tube has a second position which corresponds to the backwash step as shown in FIG. 4. In the second position, seal 57 of tube 30 is in sealing engagement with ring 36 preventing water flow through passage 38. Seal 57 at this time does not engage ring 35 and as a result, the incoming hard water may flow from chamber 41 through passage 40 and into chamber 47 and out through the outlet 24 of the assembly in a hard condition. Simultaneously, water from chamber 47 passes through passage 39 and into chamber 52. The hard water in chamber 52 then flows downwardly through the outlet port 32 and into the soft water tank. The water then exits the soft water tank via the inlet port 28 and passes through apertures 64 of tube 30 which are positioned at this time within chamber 51. The water is then drained from the movable tube in the direction of arrow 66 into drain tube 65 and out through drain outlet 26.

Subsequent to the backwash step, brine is then inserted into the water softener tank followed by a slow rinse. The movable tube assumes the position shown in FIG. 5 during the brine and slow rinse step. Seal 57 is in sealing engagement with ring 36 preventing water flow from chamber 41 through passage 38 to the second chamber 51. The second seal 58 is in sealing engagement with ring 37 thereby preventing water flow from chamber 47 through the second passage 39 to the third chamber 52. As a result, water from the hard water inlet 23 is prevented from entering the soft water tank 21 through either the inlet port 28 or the outlet port 32.

Figure 5:
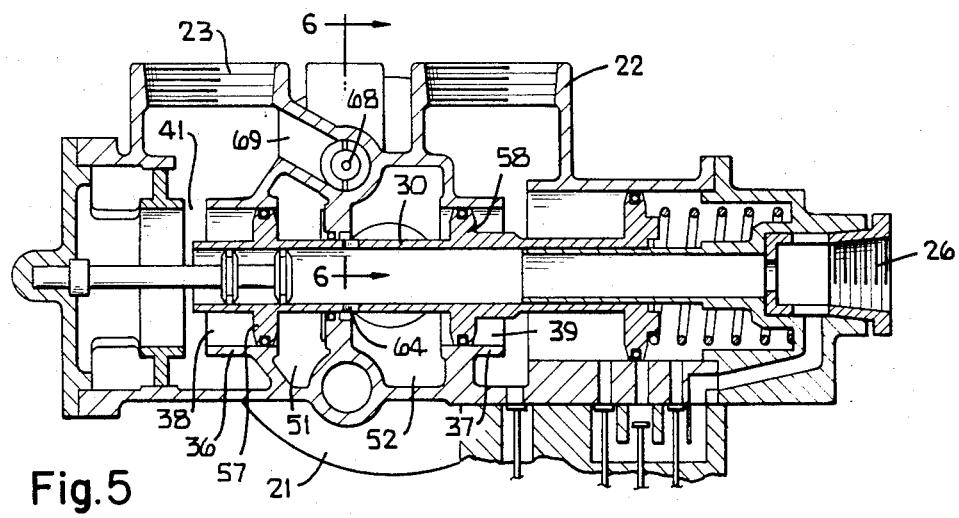
FIG. 5 is the same view as FIG. 4 only showing the movable tube in the position corresponding to the brine and slow rinse cycle.
Figure 6:
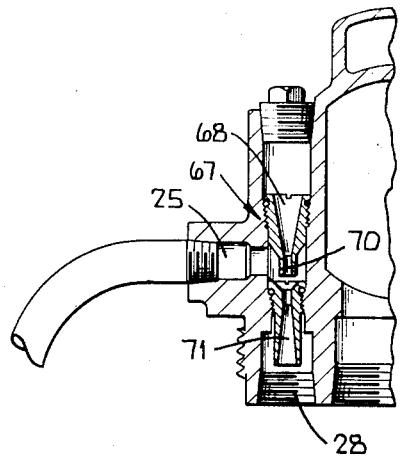
FIG. 6 is an enlarged fragmentary cross-sectional view taken along the line 6—6 of FIG. 5 and viewed in the direction of the arrows.

Housing 22 has a venturi 67 with an inlet 68 (FIG. 6) in communication with the hard water inlet 23 via passage 69 (FIG. 5). The restricted portion 70 of venturi 67 is in communication with brine inlet 25 which is connected to a brine storage tank. The outlet 71 of venturi 67 opens into inlet port 28. Since water is prevented from entering the inlet port 28 via chamber 51, a water pressure differential is caused to exist over the venturi thereby causing the brine to flow into the venturi and down through the outlet port 28 into the water softener tank. The drain water from the water softener tank is then forced up through the outlet port 32 and into chamber 52. The drain water than enters movable tube 30 through apertures 64 which are positioned within chamber 52. The drain water then flows from the movable tube through the drain tube and out the drain outlet 26. After all of the brine has been drained from the brine tank through the venturi, then hard water will flow through the venturi and into the water softener tank thereby providing a slow rinse of the water softener tank.

Figure 7:
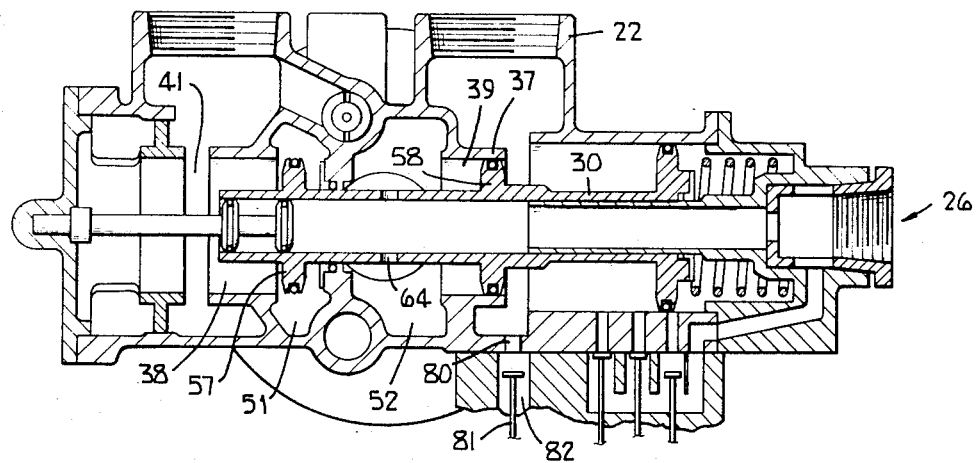
FIG. 7 is the same view as FIG. 5 only showing the movable tube in the position corresponding to the fast rinse and brine refill cycle.

Subsequent to the brine and slow rinse step, movable tube 30 moves to a fourth position as shown in FIG. 7 for accomplishing the fast rinse and brine refill step. While in this position, the first seal 57 is positioned within chamber 51 whereas the second seal 58 is in sealing engagement with ring 37. Thus, water is allowed to flow from the water inlet and chamber 41 through passage 38 and into the water softener tank via the inlet port 28 forcing the drain water from the tank via the outlet port and into chamber 52. The drain water then enters apertures 64 and drains out through the movable tube and drain tube exiting the assembly via drain exit 26. Thus, a fast rinse of the water softener tank is provided. It should be noted that chamber 47 (FIG. 2) is in constant communication with the outlet port 24 during the backwash step (FIG. 4), the brine and slow rinse step (FIG. 5), and the fast rinse and brine refill step (FIG. 7) thereby providing hard water to the user while the system is undergoing regeneration. During the softening of the water, seal 57 prevents the hard water from flowing through chamber 47 to the outlet 24.

The reduced diametered portion 60 of frame 22 is provided with three valve outlet apertures 73, 74 and 75. Three control pistons 76, 77, and 78 are slidably mounted to housing 22 and are movable for selectively closing and opening valve apertures 73 through 75. Seal 59 (FIG. 1) is fixedly mounted to movable tube 30 and is in constant sealing engagement with the reduced diametered portion 60 throughout the operation of the water softener valve assembly. Valve 59 is provided with a hole 79 which allows fluid from passage 39 and chamber 47 to pass through seal 59 into chamber 61. When valves 76 throgh 78 are in the closed position, sealing apertures 73 through 75, the helical spring and fluid within chamber 61 is sufficient to prevent movement of tube 30 from the position shown in FIG. 1. When piston 76 is moved so as to open aperture 73, the fluid within chamber 61 is allowed to escape with the resulting water pressure in passage 39 forcing the movable tube in the direction of arrow 66 (FIG. 4) until seal 59 is adjacent aperture 73 (FIG. 4). The fluid escaping out aperture 73 is then routed through passage 80' which empties into drain exit 26. By closing aperture 73 and opening aperture 74, the movable tube is caused to move further to the right to the brine cycle and slow rinse position adjacent aperture 74 as shown in FIG. 5. By closing aperture 73 and 74 and opening aperture 75 with piston 78, the removable tube is caused to move further to the right to the fast rinse and brine refill step with seal 59 being located adjacent aperture 75. Pistons 76 through 78 may be operated by an electrically driven cam apparatus which controls the various times of opening of the pistons. Such a cam apparatus is disclosed in my copening U. S. Pat. application, Ser. No. 256,172, Filed May 23, 1972, under the title PROGRAMMER GEAR DEVICE WITH SLIDABLE ACTUATOR BAR and said patent application is hereby incorporated by reference.

A fourth valve outlet aperture 80 (FIG. 7) is provided in housing 22 and opens into chamber 47. Piston 81 is slidably mounted to the housing and is movable to open and close aperture 80. Aperture 80 opens into the passage 82 which receives piston 81 with passage 82 being connected to the brine storage tank. By moving piston 81 to open aperture 80, water is caused to flow to the brine storage tank thereby replenishing the water within the brine storage tank subsequent to the fast rinse step. By controlling the duration of time that aperture 80 is opened, the amount of water entering the brine storage tank may be controlled and thus, the amount of brine may be controlled for reinsertion into the water softener tank during the brine cycle and slow rinse step shown in FIG. 7.

Piston 53 (FIG. 1) includes a piston rod 83 which is fixedly secured to end cap 54. A pair of spaced apart seals 84, and 85 are mounted to rod 83 (FIG. 1) with aperture 64 being located between seals 84 and 85 when the movable tube 30 is in the first position shown in FIG. 1. At all other times, aperture 64 is positioned between seal 85 and drain tube 65.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A water softener valve assembly comprising:
    a housing having a hard water inlet, a soft water outlet, an inlet port and an outlet port connectable to a water softener tank, a brine inlet, a drain outlet, and first, second, third and fourth chambers, said housing having a first passage between said first and second chambers, a second passage between said third and fourth chambers, and a third passage between said first and fourth chambers, said hard water inlet opens into said first chamber, said second chamber opens into said inlet port, said outlet port opens into said third chamber, said fourth chamber extends from said second passage to said soft water outlet and to said third passage;
    a drain tube connected to said drain outlet and being fixedly mounted in said housing;
    a piston fixedly mounted in said housing and projecting through said first passage and third passage; and
    a movable tube slidingly mounted in said housing and extending through said passages, said movable tube having opposite ends sealingly receiving respectively said piston and said drain tube and having an aperture between said opposite ends allowing fluid flow into said movable tube and then into said drain tube and out said drain outlet, said movable tube having first and second seals fixedly mounted thereon being slidingly engageable with said housing to support said movable tube and limit fluid flow through said passages, said movable tube having a first position corresponding to a water softening step with said first seal sealingly engaging said third passage and preventing fluid flow directly from said first chamber to said fourth chamber and allowing fluid flow from said hard water inlet to flow from said first chamber through said first passage and into said second chamber and through said inlet port and into said water softener tank and back out said outlet port to said soft water outlet, said piston sealingly projecting between said aperture and said drain tube preventing water flow out said drain tube.

2. The water softener valve assembly of claim 1 wherein:
    said movable tube has a second position corresponding to a backwash step wherein said first seal sealingly engages said first passage preventing water flow from said first chamber through said first passage to said second chamber, said first seal not engaging said third passage in said second position allowing water flow from said first chamber through said third passage and into said fourth chamber and then through said water outlet and also through said second passage, water flowing through said second passage then enters said third chamber and into said water softener tank through said outlet port and back out said tank through said inlet port to said second chamber, said aperture is positioned between said piston and said drain tube and is located in said second chamber when said movable tube is in said second position allowing backwash water exiting said tank at said inlet port to flow through said aperture and out said movable tube to said drain tube.

3. The water softener valve assembly of claim 2 wherein:

said housing has a venturi with an inlet in communication with said hard water inlet, a restricted passage in communication with said brine inlet and a venturi outlet opening into said inlet port whereat water flow through said venturi forces brine from said brine inlet into said tank through said venturi and said inlet port;

said movable tube has a third position corresponding to a brine and rinse step wherein said first seal is in sealing engagement with said first passage preventing water flow from said first chamber through said first passage directly to said second chamber and into said tank via said inlet port thereby providing a pressure drop across said venturi, said second seal sealing engages said second passage preventing water flow from said fourth chamber through said second passage to said third chamber, said aperture is positioned in said third chamber when said tube is in said third position allowing water to drain from said tank via said outlet port through said aperture and out said drain tube as said brine enters said tank.

4. The water softener valve assembly of claim 3 wherein:

said housing has a fifth chamber with a first, second and third valve outlet aperture;

said movable tube has a third seal fixedly mounted thereto in constant sealing engagement with said fifth chamber, said third seal has a leakage hole allowing fluid flow through said third seal into said fifth chamber; and further comprising:

control pistons slidably mounted to said housing for selectively closing and opening said valve outlet apertures;

a spring mounted to said housing and abutting said movable tube normally urging said tube to said first position when said valve outlet apertures are closed by said control pistons but yieldable to allow said movable tube to move under fluid pressure from said thord and fourth chambers to said second position when said first valve outlet aperture opens, and to move to said third position when said second valve aperture opens.

5. The water softener valve assembly of claim 4 wherein:

said movable tube has a fourth position corresponding to a rinse and brine refill step wherein said first seal is positioned in said second chamber allowing water flow from said water inlet and said first chamber through said first passage into said second chamber and then into said tank via said inlet port forcing drain water from said tank via said outlet port and through said aperture of said movable tube located in said third chamber and out said drain tube, said second seal sealingly engages said second passage preventing flow from said third chamber through said second passage and into said fourth chamber; and, said housing has a brine refill outlet communicating with said fourth passage and connected to a brine tank with one of said control pistons movable to open and close said brine refill outlet.

6. The water softener valve assembly of claim 5 wherein:

said piston includes a pair of spaced apart seals in sealing engagement with said movable tube with said aperture of said movable tube positioned between said spaced apart seals when said movable tube is in said first position;

said housing has a seal mounted thereto in sealing engagement with said movable tube preventing flow directly from said second chamber to said third chamber.

7. The water softener valve assembly of claim 6 wherein:

said spring is a helical spring positioned in said fifth chamber and abutting said third seal.

* * * * *